INVENTORS
ARTHUR R. McPHERSON
ROBERT R. TURNER

INVENTORS
ARTHUR R. MacPHERSON
ROBERT R. TURNER
BY— Smart & Biggar
ATTORNEYS.

Jan. 23, 1962   A. R. MacPHERSON ETAL   3,017,993
AIR CLASSIFICATION SYSTEM

Filed Dec. 31, 1958   8 Sheets-Sheet 6

INVENTORS
ARTHUR R. MacPHERSON
ROBERT R. TURNER
BY *Smart & Biggar*
ATTORNEYS

Jan. 23, 1962 A. R. MacPHERSON ETAL 3,017,993
AIR CLASSIFICATION SYSTEM
Filed Dec. 31, 1958 8 Sheets-Sheet 8

INVENTORS
ARTHUR R. McPHERSON
ROBERT R. TURNER
BY— Smart & Biggar.
ATTORNEYS.

United States Patent Office
3,017,993
Patented Jan. 23, 1962

3,017,993
AIR CLASSIFICATION SYSTEM
Arthur R. MacPherson and Robert R. Turner, Toronto, Ontario, Canada, assignors to Aerofall Mills Inc., Columbus, Ohio
Filed Dec. 31, 1958, Ser. No. 784,129
6 Claims. (Cl. 209—144)

This invention relates to an apparatus and a method for use in association with combined dry crushing and grinding mills for recovering from an airstream entrained particles having a predetermined size-weight factor, and more particularly it relates to an air classifier for use in connection with material reduction mills from which product is withdrawn in a stream of air whereby the separation and recovery of particles of particular size-weight factors from the airstream may be accomplished.

In the art of comminuting solid materials such as rock, ore and the like, it has long been recognized that basically it is desirable to produce a subdivided product in which the valuable constituents are present as essentially primary crystals, since the reduction in size of the individual particles to a further degree normally does not result in any benefit insofar as subsequent recovery of the values is concerned, but may on the other hand result in the formation of slimes, rendering subsequent recovery more difficult. On the other hand, if the material is not reduced to the point where the values are in the form of primary crystals, the particles themselves will be combined aggregates of gangue materials and values which cannot be separated from each other by normal mechanical means such as gravity concentration.

In using combined dry crushing and grinding mills of the type described for instance in U.S. Patent No. 2,555,171, dated May 29, 1951, entitled Material Reduction Mill by David Weston, and U.S. Patent No. 2,704,636, dated March 27, 1955, also by David Weston, the product produced is in most cases ideally in the form of primary crystals of the natural grain size of the material being treated.

It frequently is the case with many types of material that the natural grain sizes of the mineral constituents and the host rock is of different sizes, and it may also frequently be the case that a substantial quantity of material in the mill product may be removed from the mill in the form of aggregates of primary crystals which, due to the physical structure of the mineral, tend, under the conditions of reduction, to remain adhered together. In order to take full advantage of the differential reduction which takes place in such mills, it is frequently desirable to collect different particle size fractions of the mill product separately in order that these fractions may individually be subjected to the most appropriate further processing having regard to their constitution and nature. In some cases, the coarse fraction of the product may contain a relatively high proportion of values, in which case it represents a concentrate. In other cases, the coarse fraction may contain a relatively small percentage of values, in which case it may represent a tailing, or it may be desirable to subject it to further reduction to release the values still contained in it. In all cases, however, whether the coarse fraction of the material represents a concentrate or not, it is desirable that the separation be as clean as possible so that the unseparated fine material contains substantially no particles coarser than a given size, and the separated coarse fraction contains substantially no particles smaller than a given size.

Conventional equipment has been found not to accomplish the results desired. For instance, conventional cyclones which constitute the most usual form of separator in systems of the nature under consideration are subject to the disadvantages, firstly, that a considerable amount of attrition takes place as a result of contact of the coarser particles with the walls of the cyclone and of the duct work necessary to conduct the loaded airstream some distance from the mill to the cyclone inlet. This results in an appreciable proportion of the desired larger particles breaking down to finer particles which fail to be separated and which pass through the cyclone together with the original fine material. Secondly, it is frequently the case that by far the largest quantity of material will be in the coarse fraction that it is desired to separate, and the transporting of this material to a cyclone and separation of it from the fine fraction at that point consumes a substantial amount of power. Furthermore, even when a cyclone used for coarse products collection is provided with an air purge in its discharge duct, it has been found from experience that it is impossible to reduce the amount of fines carried into the coarse product to the desired degree. As it is desired that this coarse fraction be removed from the air circuit as closely adjacent the mill outlet as is practical, resort has been had to classifiers of the type described in U.S. Patent No. 2,696,908, dated December 14, 1954, by David Weston. Such classifiers, while they have the advantage of removing the coarse material closely adjacent the mill outlet and also produce a relatively clean coarse product, still retain the inherent disadvantage that a substantial amount of attrition takes place with them, so that an undesirable large amount of the coarse material removed from the mill is reduced to a size range which permits it to accompany the original fine product into the fine products collection system.

The present invention provides a classifier and method in which the above described disadvantages are overcome to a large degree and makes possible the collection of a comparatively clean coarse product with a minimum amount of the original coarse material being further broken down to accompany the fine materials beyond the point of separation of the coarse product.

The present invention is adapted for use in connection with material reduction mills of the type wherein the product is removed from the mill in a stream of air and has as its principal object the provision of a classifier arranged to form a part of the air circuit in a mill of this type which is capable of removing from the airstream immediately after the mill substantially all particles having a size-weight factor above a predetermined value, and recovering therefrom such particles as are within a given size range.

It is also an object of this invention to provide such a classifier which is essentially simple in construction and requires a minimum of maintenance during operation.

According to the present invention, the airstream in the mill outlet duct is led tangentially to the upper side of a cyclone in which the zone of cyclonic flow has its axis substantially horizontal rather than vertical. The airstream is caused to swirl about said horizontal axis, the coarse product being collected from the lower side of the cyclone, the separating zone being principally that part of the cyclone where gravity and centrifugal force combine at the lower periphery of the swirling airstream. The airstream still containing the unseparated fine material is withdrawn from the cylone substantially horizontally through a sleeve therein whose longitudinal axis coincides substantially with the axis of cyclonic flow.

Preferably, according to the invention, the coarse product is purged during discharge from the airstream with an auxiliary airstream passed axially upwardly through the discharge, or transversely therethrough, in a manner to be later described.

The invention and its operation will be understood more clearly from the following detailed specification which describes a number of embodiments thereof in association with the accompanying drawings wherein.

Figure 1:
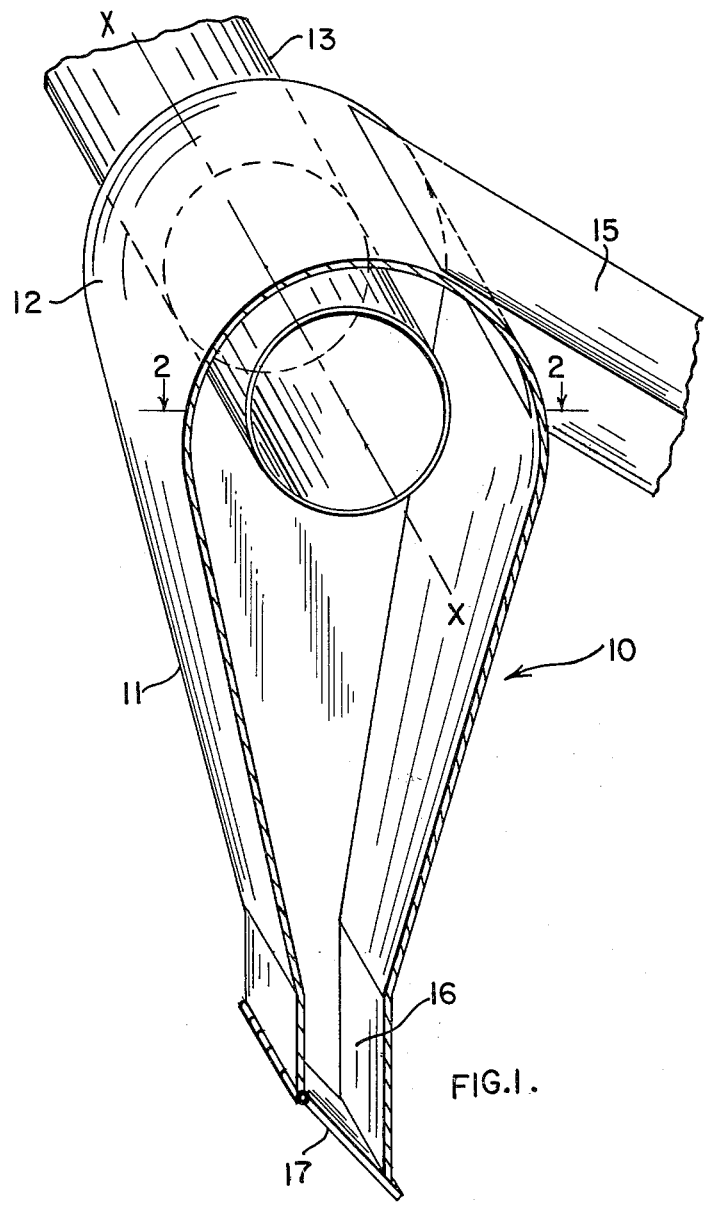
FIG. 1 is an end view mainly in section of an embodiment of a separator according to the invention.
Figure 2:
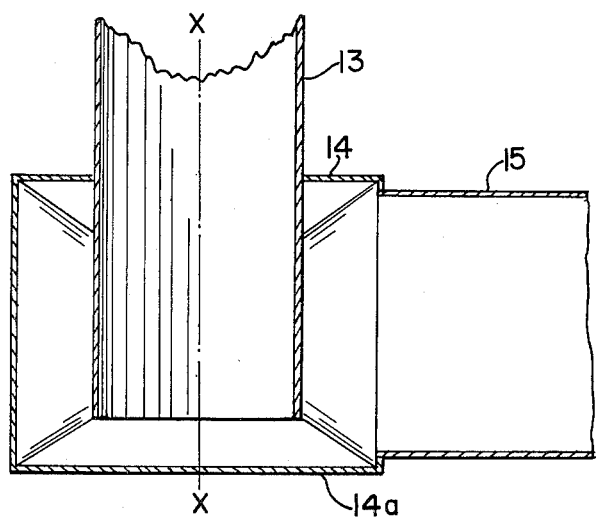
FIG. 2 is a top plan view of the embodiment illustrated in FIG. 1 taken along the plane 2—2 of FIG. 1 as viewed in the direction of the arrows.
Figure 4:
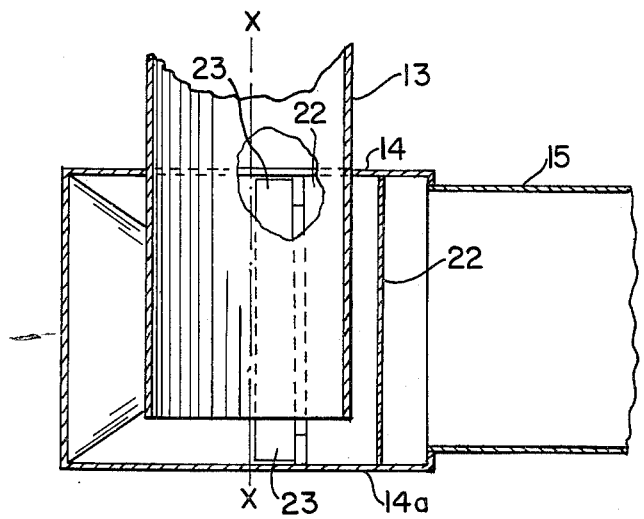
FIG. 4 is a top plan view of the embodiment illustrated in FIG. 3 taken along the plane 4—4 as viewed in the direction of the arrows.

Referring to the drawings, and in particular to FIG. 1, a sectional view is shown of an embodiment of the invention comprising a horizontal classifier indicated generally by the numeral 10 and designed to operate on the cyclonic flow principle. The classifier is characterized by a lower tapered portion 11 into which coarse particles are gravimetrically deposited and an upper arcuate portion 12 which curves substantially semi-cylindrically about the horizontal axis X—X which is the axis of cyclonic flow as well as the longitudinal axis of discharge sleeve 13 which enters the classifier horizontally from the rear 14 to short of the forward portion 14a as shown more clearly in the plan view of the cross section shown in FIG. 2 taken along line 2—2 of FIG. 1.

Duct 15 from the discharge end or downstream side of the mill merges tangentially with the upper arcuate portion of the classifier in order to conduct the product-laden airstream emanating from the mill cyclonically about sleeve 13 without coming into abrupt contact with deflecting surfaces which normally cause attrition of the coarse particles. As will be shown more clearly later, an inertial roughing effect is achieved by this type of flow whereby through the combined action of gravity and centrifugal force a substantially clean separation of coarse from fines is obtained, the coarse dropping to discharge end 16, the suspended fines being drawn off horizontally through sleeve 13 which is under negative pressure and conducted on to a fines collecting system (for example a multi-cyclone collector not shown). Discharge end 16 has a hinged connected flap 17 biased to hold a given weight of coarse product which when exceeded opens and discharges the coarse product into either a collecting bin or upon a conveyor for returning it to the feed side of the mill or to discard, depending on whether or not the coarse material contains metal values.

As a preferred embodiment of FIG. 1 it may be desirable to further control the flow of the product-laden airstream into the classifier so that the stream is not prematurely drawn through horizontal sleeve 13 before separation has occurred.

Figure 2A:
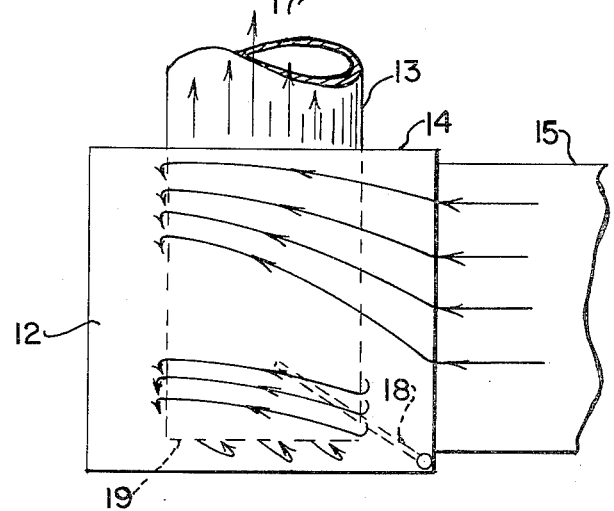
FIG. 2a is a top view of FIG. 1 showing the addition of a damper means for controlling the direction of the airstream in the separator.

This is achieved by utilizing a vertically swinging damper 18 as shown in plan view in FIG. 2a, whereby the airstream is caused to swirl cyclonically about sleeve 13 but towards the rear 14 of the classifier from which it is induced to work its way out helically about sleeve 13 by virtue of the negative pressure therein to its forward end or mouth 19 where by this time the stream has been substantially depleted of coarse particles and enriched in fines before being drawn off horizontally through the sleeve. The angle to which vertical damper 18 is pivotally set may depend upon the size distribution of the product emanating from the mill. If the particles to be separated are not too coarse then it may be necessary to direct a good portion of the product-laden airstream towards the rear of the classifier so that it will take longer for the stream to work its way out helically to the mouth of the sleeve, thereby giving the coarse particles a longer time period over which to separate centrifugally and to settle out gravimetrically.

Figure 3:
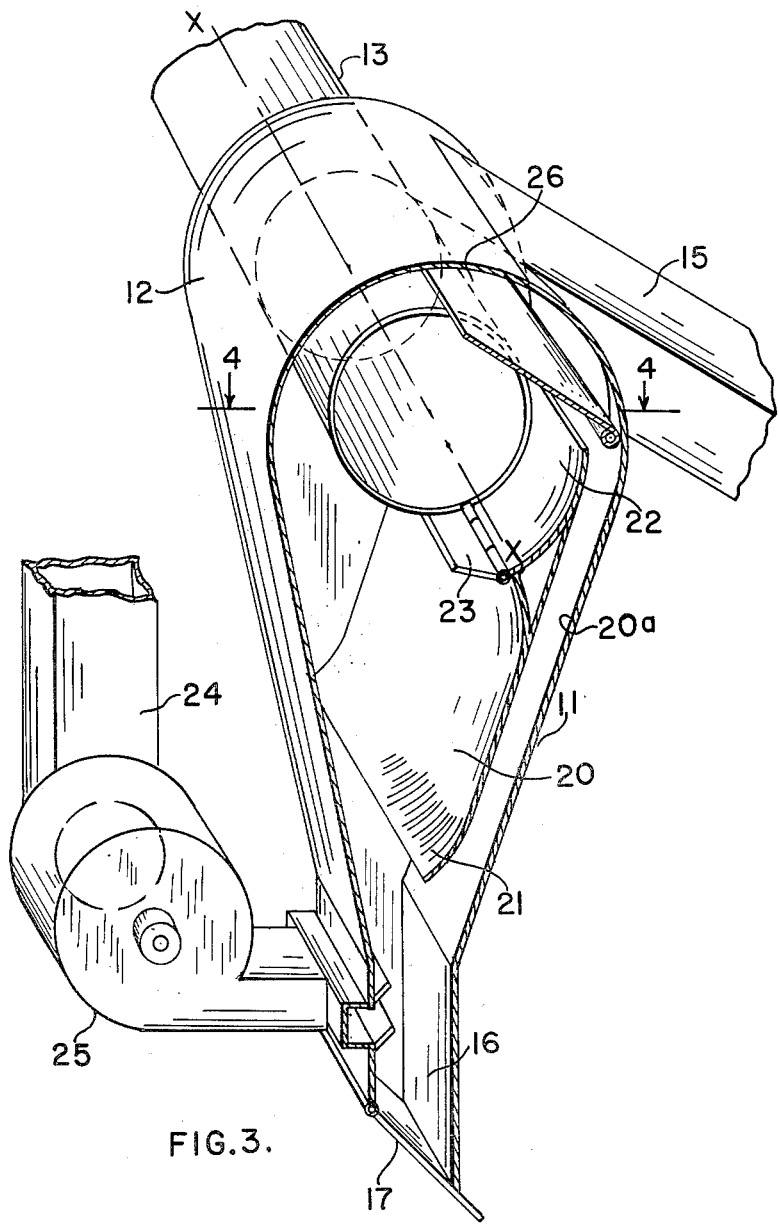
FIG. 3 is a vertical sectional view of an alternative embodiment of a separator according to the invention similar to that shown in FIG. 1 but embodying a preferred form of air purge and illustrating a particular form of baffling which may be employed within the separator.

In situations where a very clean separation is required, particularly in instances where either the coarse or the fines carry a high premium based on metal content, the embodiment of FIG. 3 might be preferred. This embodiment utilizes a baffle assembly intermediate the sleeve and an inner wall of the classifier comprising baffle plate 20 extending downwardly along and adjacent classifier wall 20a to just above the discharge end of the classifier and flaring outwardly slightly at 21 and also extending upwardly and terminating as a substantially cylindrically curved segment about sleeve 13. Intermediate the upper and lower ends of the aforementioned baffle assembly hinged damper 23 is preferably employed which may be set at any desired angle towards or away from the surface of horizontal sleeve 13, depending on the type of separation desired.

Figure 3A:
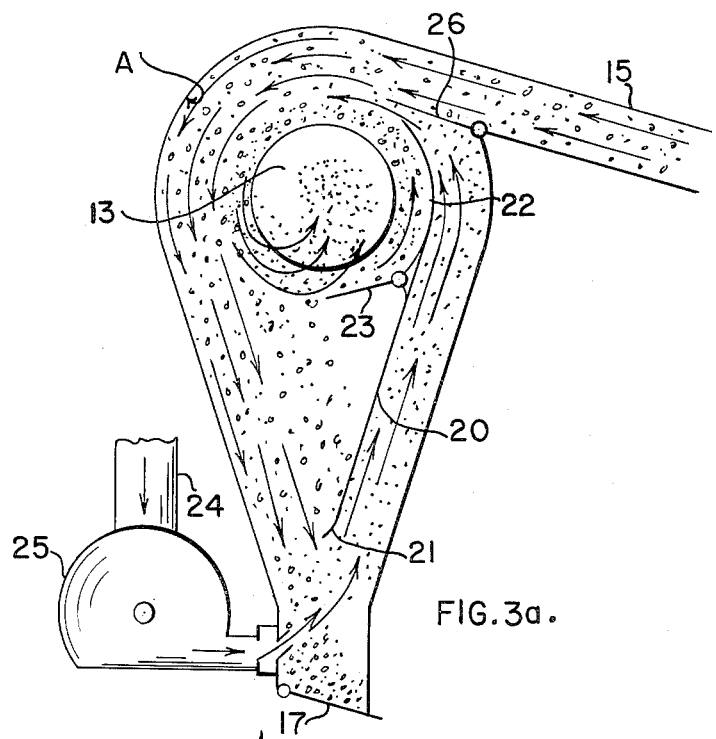
FIG. 3a is a front view diagrammatic representation of the sectional view of FIG. 3 showing the airstream flow with relation to the baffling arrangement.

Referring more particularly to the diagrammatic representation of FIG. 3a, as the product-laden air stream enters the horizontal classifier tangentially transverse to the axis X—X and flows cyclonically about the sleeve lying longitudinally along said axis, the coarse particles are thrown centrifugally to inner surface A of the classifier, the fines being retained close to the surface of the sleeve. Thus, the stream adjacent the surface of the sleeve is enriched in fines, while that portion adjacent the inner surface of the classifier is enriched in coarse particles with possibly a middlings fraction in between. By appropriately setting damper 23, the fines enriched fraction is separated from the coarse or middling fraction as the whole stream swirls about the sleeve and is finally drawn off by it through its open end.

The coarse particles urged outwardly by centrifugal force and under the pull of gravity fall together with some residual fines in a steady stream as illustrated in FIG. 3a and are subject to further separation by means of the aforementioned baffle arrangement in cooperation with an air elutriation system. This is achieved by introducing a stream of air at the bottom of the classifier via air duct 24 and blower 25 and causing it to deflect diagonally upwardly countercurrent to the fall of the particles. As the coarse particles together with the entrained fines drop to the bottom of the classifier, the upward flow of air winnows out the fines which are carried upwardly behind baffle portion 20 and around the cylindrical segment of baffle portion 22 where it is directed by damper 26 to further cyclonic flow about sleeve 13 before being drawn off by it.

It will be noted from the flow diagram of FIG. 3a that the particles do not abruptly strike the various surfaces of the classifier but, on the contrary, are directed smoothly adjacent them with the net result that very little attrition occurs.

Figure 5:
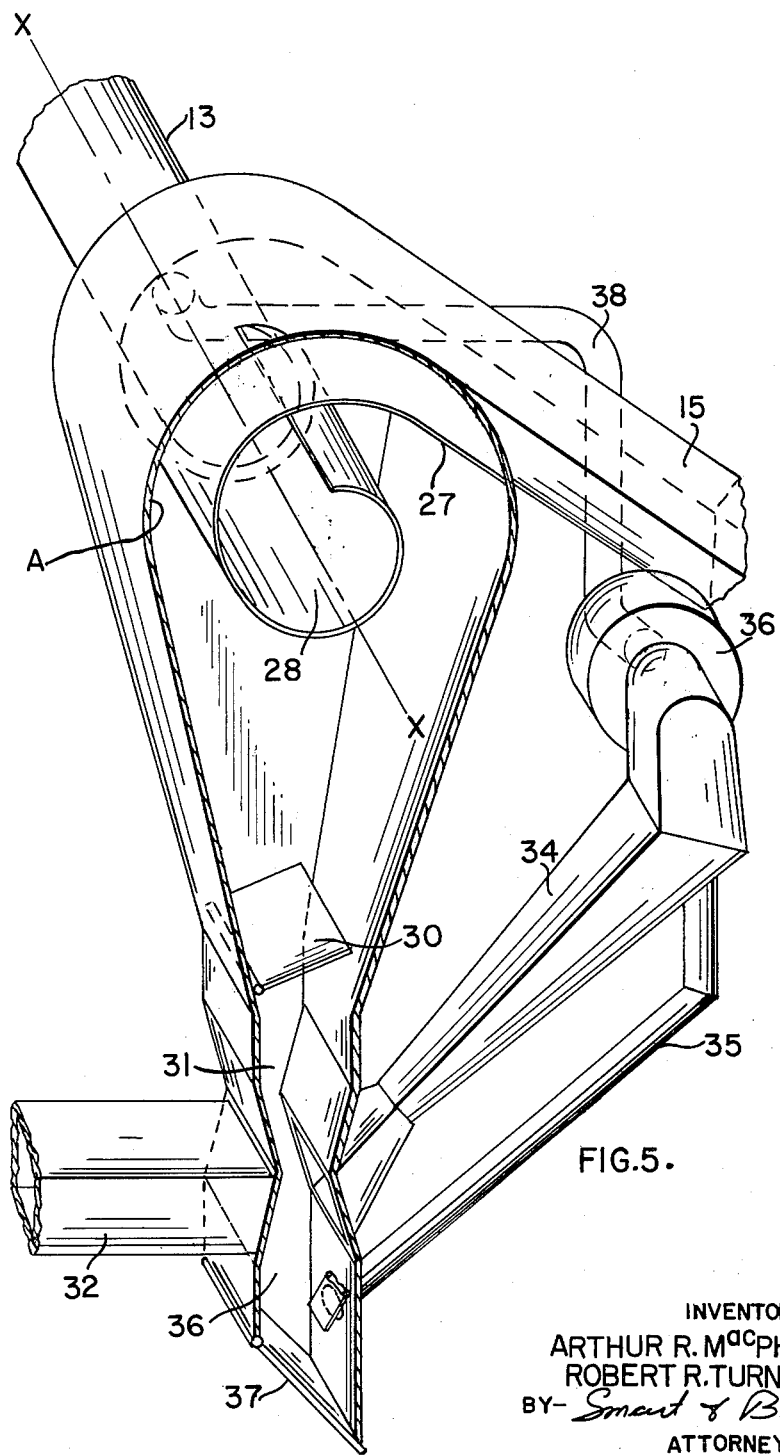
FIG. 5 is a vertical section of a further alternative embodiment of the invention illustrating the employment of a scroll for directing the air flow in the separator and also showing a more elaborate form of air purge.
Figure 6:
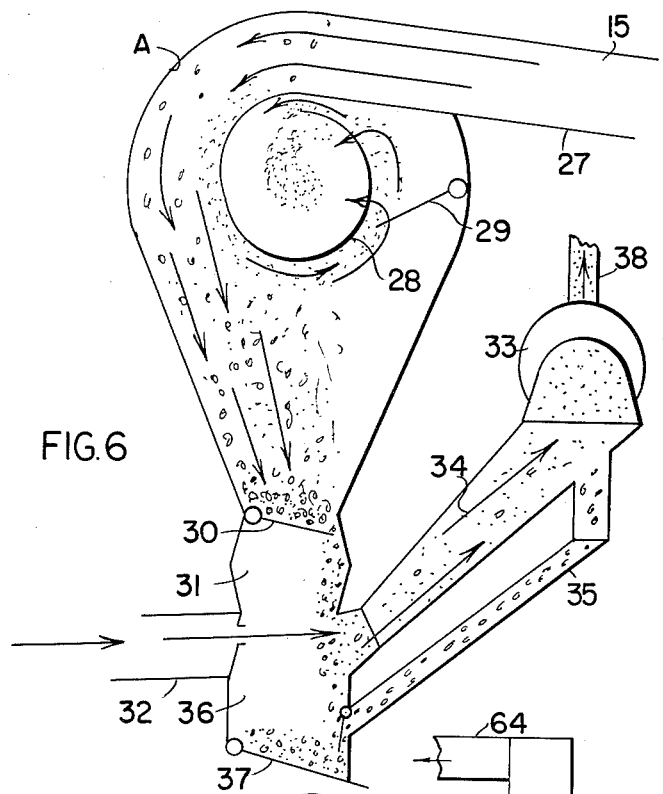
FIG. 6 is a front view diagrammatic representation of the view of FIG. 5 showing the nature of the airstream flow.

A still further embodiment which enables the separation of coarse from fine with minimum attrition is the scroll type horizontal classifier shown in FIG. 5 and diagrammatically in FIG. 6. The mill outlet duct 15 merges tangentially with the arcuate portion of the classifier, only in this case the lower end 27 of duct 15 continues on into the classifier and forms a scroll or spiral 28 about horizontal axis X—X coincident with that of sleeve 13. As pointed out earlier, the coarse particles of the product-laden stream from the mill are centrifugally urged to inner surface A of the classifier, the fine particles being retained close to the outer surface of the scroll (note FIG. 6) and spirally drawn within the interior of the scroll and out through sleeve 13. To improve further the separation between coarse and fine at this state, a damper 29 (FIG. 6) may be preferably employed to separate the fines enriched stream from the coarse or middlings fraction of the suspended matter. As in the afore-described embodiments, the coarse particles plus any of the entrained fines upon leaving the cyclonic swirl fall by gravity to the bottom of the classifier where they are subjected to additional separation treatment by means of transverse air current. The particles fall on a weighted or biased flap adapted to open up when a certain weight of product is exceeded, allowing the product to fall as a curtain to chamber 31 where it is subjected to the winnowing action of the transverse air-stream blown in through duct 32 and drawn off by suction fan 33 via duct 34. A trap is provided before the fan for removing entrained coarse particles which are discharged via return duct 35 to lower chamber 36 where they are deposited along with the winnowed product upon weighted flap 37 from which the coarse product is continuously or intermittently discharged. The entrained fines removed by fan 33 is bypassed via duct 38 to sleeve 13 where it joins the fines removed via scroll 28.

The improved results achieved by the invention will be better appreciated from the following example.

The grinding of potash salt in the combined dry crushing and grinding mills of the type described in U.S. Patent No. 2,555,171 has always presented problems because of its extreme friability. It must be recovered from the grinding unit with little fines if the flotation separation of the potash salt from common salt is to be effective. As soon as the crystals hit a duct surface or an abrading surface, breakdown occurs so that instead of getting a coarse fraction characteristic of the mill grinding condition, a different size fraction is obtained containing fines not bargained for. In using a conventional classifier of the type shown in FIG. 7, a lesser amount of the coarse fraction is obtained than when the classifier of the invention of the type shown in FIG. 1 is used.

Figure 7:
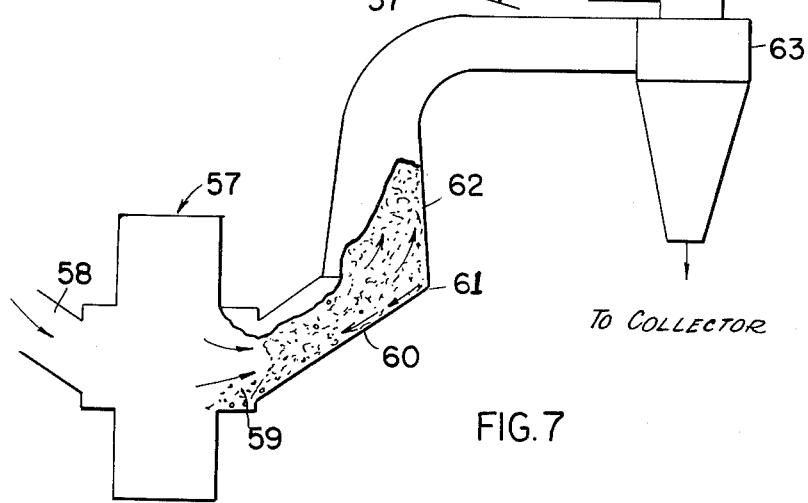
FIG. 7 shows somewhat diagrammatically a conventional type of classifier.

The system in FIG. 7 depicts a line drawing representation of a mill indicated generally by the numeral 57 of the air-swept dry crushing and grinding type shown in more detail in U.S. Patent 2,555,171. Feed material and a controlled flow of air enters the inlet side 58 of the mill and the product produced is air swept through outlet side 59 into classifier 60 (shown in partial section), the oversize being returned to the mill for further grinding as shown by the return arrows indicated in the classifier. The particles of desired size-weight factor are swept through the classifier where they strike the duct walls near elbow 61 formed between classifier 60 and conduit 62 where they are subjected to undesirable attrition on their way to cyclone 63 where further undesirable attrition occurs, the air being returned to the inlet side of the mill via conduit 64.

A test conducted on the above-mentioned type mill set for a given grinding condition gave the following products for the two types of classifying systems used:

| Mesh Size | Screen Analysis | |
| --- | --- | --- |
| | Conventional classifier | Horizontal Classifier |
| +10 | 1.0 | 4.1 |
| +20 | 13.5 | 37.5 |
| +70 | 53.0 | 46.0 |
| +200 | 17.0 | 9.9 |
| −200 | 15.5 | 2.5 |

It will be noted that the plus 20 mesh product obtained by means of the invention amounts to 37.5% by weight as against 13.5% by conventional means, a gain of about 277%. The marked difference is due largely to attrition in the conventional separator which occurs at the wear points in the system (e.g. elbows or similar connections) and at the top of a vertically disposed cyclone.

Figure 8:
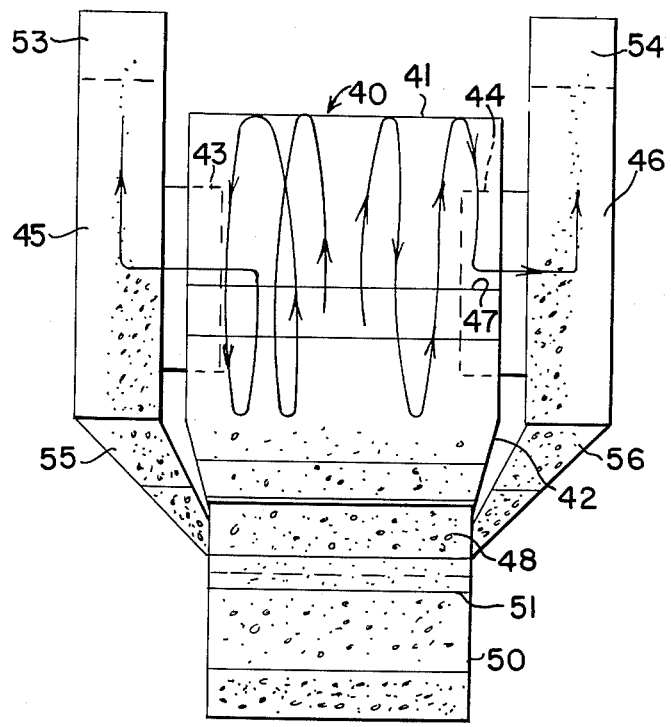
FIG. 8 is a front view of another form of a horizontal classifier provided by the invention showing the flow of a product-laden stream within it.
Figure 9:
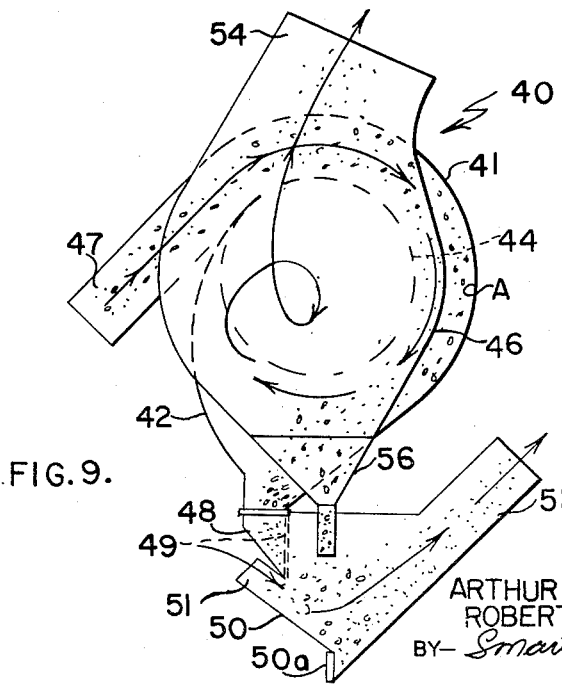
FIG. 9 is a side view representation of the classifier shown in FIG. 8.

Another embodiment of the invention which is particularly useful in high capacity systems is shown in FIGS. 8 and 9. Referring to the figures, front and side views of the embodiment are shown indicated generally by the numeral 40 comprising arcuate upper portion 41 and lower tapered portion 42 into which coarse particles are gravimetrically deposited during cyclonic flow of a product-laden air stream about the horizontal axis of the system coincident with the axes of oppositely disposed sleeves 43 and 44 which project into the upper portion 41 of the system, the sleeves extending into and being integral with outlet boxes 45 and 46, respectively.

Duct 47 is shown extending from the discharge end or downstream side of the mill (not shown) and merging tangentially with the upper arcuate or cylindrically curved portion of the cyclone. Thus, as the product-laden airstream enters the system via said duct, the stream is caused to swirl about the horizontal axis during which time coarse particles are urged centrifugally to the inner surface A of the cyclone and through the combined effect of gravity and centrifugal force deposited at the lower end 42 of the cyclone and thence into discharge end 48 having a flap 49 of either a rubber or leather strip past which the coarse particles flow into receiver 50. The coarse particles are further winnowed of fines by a flow of air through duct 51 connected to receiver 50 from a source of air supply not shown. The winnowed fines are removed through duct 52 and later combined with fines removed from the upper portion of the cyclone.

The sleeves 43 and 44 should extend sufficiently into the cyclone chamber 20 as to prevent short circuiting of the non-separated product into outlet boxes 45 and 46. The outlet boxes are connected via ducts 53 and 54 to a source of negative pressure. As the product-laden stream swirls about the horizontal axis and a substantial amount of the coarse product caused to settle out at the lower end of the cyclone, approximately half of the fines enriched stream is removed by suction through sleeve 43 and the other half through sleeve 44. As the fines enriched stream passes through the boxes, residual coarse particles settle out into the tapered portions 55 and 56 of the boxes and are fed back into receiver 50 where the returned coarse product together with the product returned directly from the cyclone is winnowed of fines as aforementioned. The fines drawn off through ducts 53 and 54 are combined with the fines delivered through duct 52 either through a common duct or by connecting the ducts to a common receiver, such as a vertical cyclone.

The coarse product collected in receiver 50 is removed via 50a which may be a weighted flap to effect continual removing of the product.

The use of the horizontal classifier of the invention immediately after the outlet portion of the mill has various other advantages in addition to those given hereinbefore. For example, the invention is especially useful in a system adapted to produce coarse and fines where the inertia of the coarse particles in regions outside the mill involving changes of volume or direction results in build-ups, pulsation, throttling or surges in airstream flow. By removing the coarse fraction immediately, the foregoing disadvantages are substantially alleviated.

Figure 10:
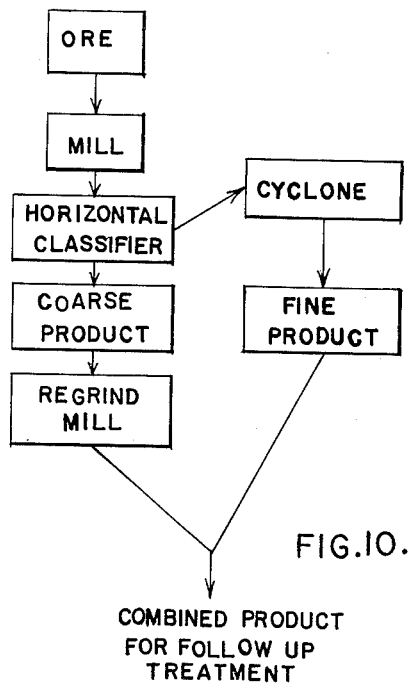
FIGS. 10 to 12 are flow sheets depicting some of the various circuits possible by utilizing the air classifying system of the invention.
Figure 11:
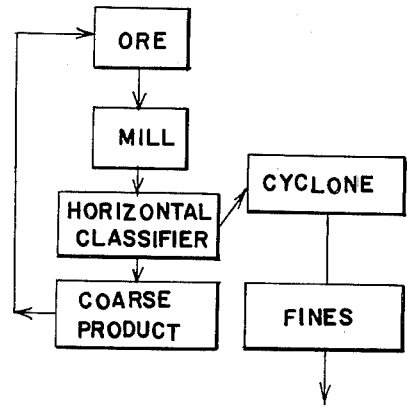

The invention is also adapted for removing coarse product for use in a different metallurgical system or for the regrinding thereof (note FIG. 10) or for immediate return to the feed side of the mill (note FIG. 11).

Figure 12:
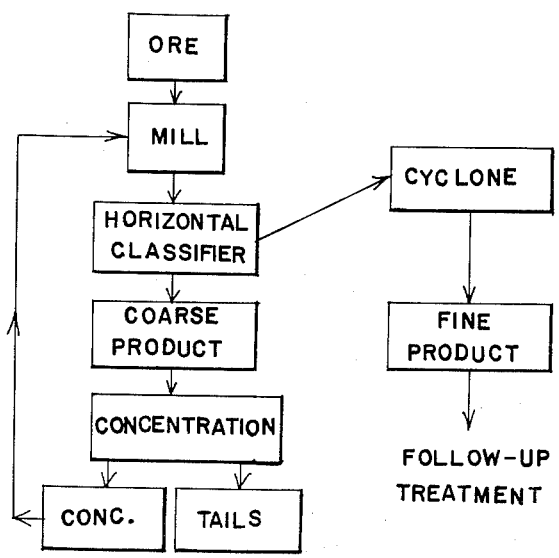

An additional advantage is the immediate removal of coarse for treatment in a concentration system for removal of tailings, the resulting concentrate being thereafter fed into the feed side of the mill as a circulatory load, with the final result of producing an overall fine product as a high grade concentrate (note FIG. 12). Thus, by eliminating coarse tailing early in the grinding process, considerable power is saved and the grinding capacity of the mill is more economically utilized.

While the invention has been described with respect to certain preferred embodiments, it will be understood by those skilled in the art that various changes and modifications may be made without departing from the spirit and scope of the invention and it is intended therefore in the appended claims to cover all such changes and modifications.

We claim:

1. A method of separating a coarse solids fraction from a product-laden airstream comprising a mixture of coarse and fine particles emanating from a grinding mill zone while minimizing the attrition of said coarse particles which comprises confining and conducting said airstream immediately emanating from said grinding zone along an unobstructed substantially straight line path of flow tangentially directed to the upper side of a zone of cyclonic flow about a horizontal axis disposed transversely to the direction of flow of said stream, whereby said coarse particles are selectively and centrifugally urged to the outer periphery of said zone, collecting said coarse particles gravimetrically at the lower periphery of said zone of cyclonic flow below the horizontal axis thereof, conducting said airstream with entrained fine solid particles substantially still remaining therein substantially along the horizontal axis of said zone of cyclonic flow from one end thereof and withdrawing the same away from the other end along said axis.

2. The method of claim 1 wherein the airstream after entering said zone of cyclonic flow is directed towards one end of said zone opposite the end from which it is conducted away and about said horizontal axis and allowed to flow helically around the horizontal axis towards the other end of said zone of cyclonic flow from which said airstream is thereafter conducted away.

3. The method of claim 1 wherein the coarse particles during gravimetric concentration are subjected to the winnowing action of a stream of air in a zone below said zone of cyclonic flow to remove and recover entrained fines and conducting said stream of recovered fines to said zone of cyclonic flow.

4. The method of claim 3 wherein the laden airstream near the periphery of the zone of cyclonic flow is split to separate the coarse enriched fraction of said airstream from the fines enriched fraction during the cyclonic flow thereof.

5. A method of separating a coarse solids fraction from a product-laden airstream comprising a mixture of coarse and fine particles emanating from a grinding mill zone while minimizing the attrition of said coarse particles which comprises confining and conducting said airstream immediately emanating from said grinding zone along an unobstructed substantially straight line path of flow tangentially directed to the upper side of a zone of cyclonic flow about a horizontal axis disposed transversely to the direction of flow of said stream, whereby said coarse particles are selectively and centrifugally urged to the outer periphery of said zone leaving a fines enriched fraction near the inner periphery thereof, spirally converging said fines enriched airstream adjacent a spiral retaining surface towards said horizontal axis, collecting said coarse particles gravimetrically at the lower periphery of said zone of cyclonic flow below the horizontal axis thereof, conducting said spirally converging airstream with entrained fine particles substantially still remaining therein substantially along the horizontal axis of said zone of cyclonic flow from one end thereof and withdrawing the same away from the other end of said axis.

6. The method of claim 5 wherein the coarse particles during gravimetric concentration are subjected to the winnowing action of a stream of air in a zone below said zone of cyclonic flow to remove and recover entrained fines and conducting said stream of recovered fines to said zone of cyclonic flow.

References Cited in the file of this patent

UNITED STATES PATENTS

| 474,490 | Walter | May 10, 1892 |
| 1,620,241 | Stebbins | Mar. 8, 1927 |
| 1,882,329 | Kreisinger | Oct. 11, 1932 |
| 2,270,143 | Schaich | Jan. 13, 1942 |
| 2,381,954 | Hardinge | Aug. 14, 1945 |
| 2,591,043 | Berndt | Apr. 1, 1952 |

FOREIGN PATENTS

| 700,177 | France | Dec. 22, 1930 |